United States Patent
Lin

(10) Patent No.: US 7,354,160 B2
(45) Date of Patent: Apr. 8, 2008

(54) PROJECTOR WITH ADJUSTABLE IMAGE OFFSET

(75) Inventor: Ying-Fang Lin, Tao-Yuan (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 0 days.

(21) Appl. No.: 11/563,694

(22) Filed: Nov. 28, 2006

(65) Prior Publication Data

US 2007/0097338 A1  May 3, 2007

Related U.S. Application Data

(63) Continuation of application No. 10/711,857, filed on Oct. 10, 2004, now abandoned.

(51) Int. Cl.
*G03B 21/20* (2006.01)
*G03B 21/30* (2006.01)

(52) U.S. Cl. .................. 353/87; 353/101; 348/745

(58) Field of Classification Search .................. 353/30, 353/31, 33, 34, 100, 101, 98, 99, 22, 122, 353/119, 87, 70, 69; 359/813; 348/745–747, 348/771
See application file for complete search history.

(56) References Cited

U.S. PATENT DOCUMENTS

| | | | | |
|---|---|---|---|---|
| 5,283,599 | A * | 2/1994 | Tejima et al. | 353/30 |
| 6,113,240 | A * | 9/2000 | Iizuka | 353/31 |
| 6,264,333 | B1 * | 7/2001 | Iizuka | 353/101 |
| 6,309,094 | B1 * | 10/2001 | Woerner | 362/539 |
| 6,467,911 | B1 * | 10/2002 | Ueyama et al. | 353/87 |
| 6,601,959 | B2 * | 8/2003 | Miyata et al. | 353/98 |

\* cited by examiner

*Primary Examiner*—Andrew T. Sever
(74) *Attorney, Agent, or Firm*—Winston Hsu

(57) ABSTRACT

A projector includes illumination optics for providing light beams, a light modulating apparatus for receiving and modulating the light beams provided by the illumination optics, a projection lens for projecting an image of the light beams received from the light modulating apparatus, a first adjusting device for adjusting a position of the illumination optics and adjusting an angle of incidence of the light beams emitted onto the light modulating apparatus, and a second adjusting device for adjusting a position of the projection lens in response to the adjustment of the position of the illumination optics for creating an offset of a position of the image projected by the projection lens.

10 Claims, 7 Drawing Sheets

PROJECTOR WITH ADJUSTABLE IMAGE OFFSET

CROSS REFERENCE TO RELATED APPLICATIONS

This application is a continuation of applicant's earlier application, Ser. No. 10/711,857, filed Oct. 10, 2004, now abandoned the entirety of which is incorporated by reference.

BACKGROUND OF THE INVENTION

1. Field of the Invention

The present invention relates to a projector, and more specifically, to a projector containing optical components with adjustable positions for adjusting an offset of projected images.

2. Description of the Prior Art

Image projectors, including digital projectors, are becoming increasingly popular for giving presentations or for home or office use. When setting up a projector for a specific location, the projector must be placed a suitable distance from a screen or other viewing surface. In addition, the projector must be positioned at a proper height and projection angle with respect to the horizontal. Since adjusting the projecting angle is such a common task, many projectors are equipped with adjustable legs positioned under one or more edges of the projector for raising or lowering the projector. By manually changing the height of the adjustable legs, images projected by the projector can be displayed on the proper area of the screen. However, the greater the angle in which the projector is raised, the more distorted the projected image will be. Distortion causes the projected images to appear as a trapezoid. In addition, the projected light intensity is not uniform for the entire image projected on the screen.

Unfortunately, changing the height of the adjustable legs may involve interruption of the presentation since the projector may have to be lifted up to allow the adjustable legs to be adjusted. Moreover, the process of adjusting the viewing angle of the projected image may require the legs to be adjusted several times through trial and error. To correct this problem, a simpler way of adjusting an offset of projected images is needed.

Adjustable lenses are available on the market for changing the focus of projected images. However, adjustable lenses can have the problem of emitting light at the wrong angle. Using the adjustable lenses in conjunction with an adjustable illumination optics system would improve the situation, but there are no adjustable illumination optics systems currently in use in projectors.

SUMMARY OF THE INVENTION

It is therefore an objective of the claimed invention to provide a projector with movable optical components in order to solve the above-mentioned problems.

According to the claimed invention, a projector includes illumination optics for providing light beams, a light modulating apparatus for receiving and modulating the light beams provided by the illumination optics, a projection lens for projecting an image of the light beams received from the light modulating apparatus, a first adjusting device for adjusting a position of the illumination optics and adjusting an angle of incidence of the light beams emitted onto the light modulating apparatus, and a second adjusting device for adjusting a position of the projection lens in response to the adjustment of the position of the illumination optics for creating an offset of a position of the image projected by the projection lens.

It is an advantage of the claimed invention that the offset of the projected image can be adjusted without lifting up the projector and without adjusting the height of the legs of the projector. In addition, images projected from the projector will not be distorted and have the shape of a trapezoid. This also ensures that the projected light intensity is more uniform for the image projected on the screen. The first and second adjusting devices can be operated manually or electronically with a motor for quickly and conveniently adjusting the image offset. In this way, the proper viewing angle can be achieved without lifting up the main body of the projector and without needless adjustment of the legs of the projector through trial and error.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
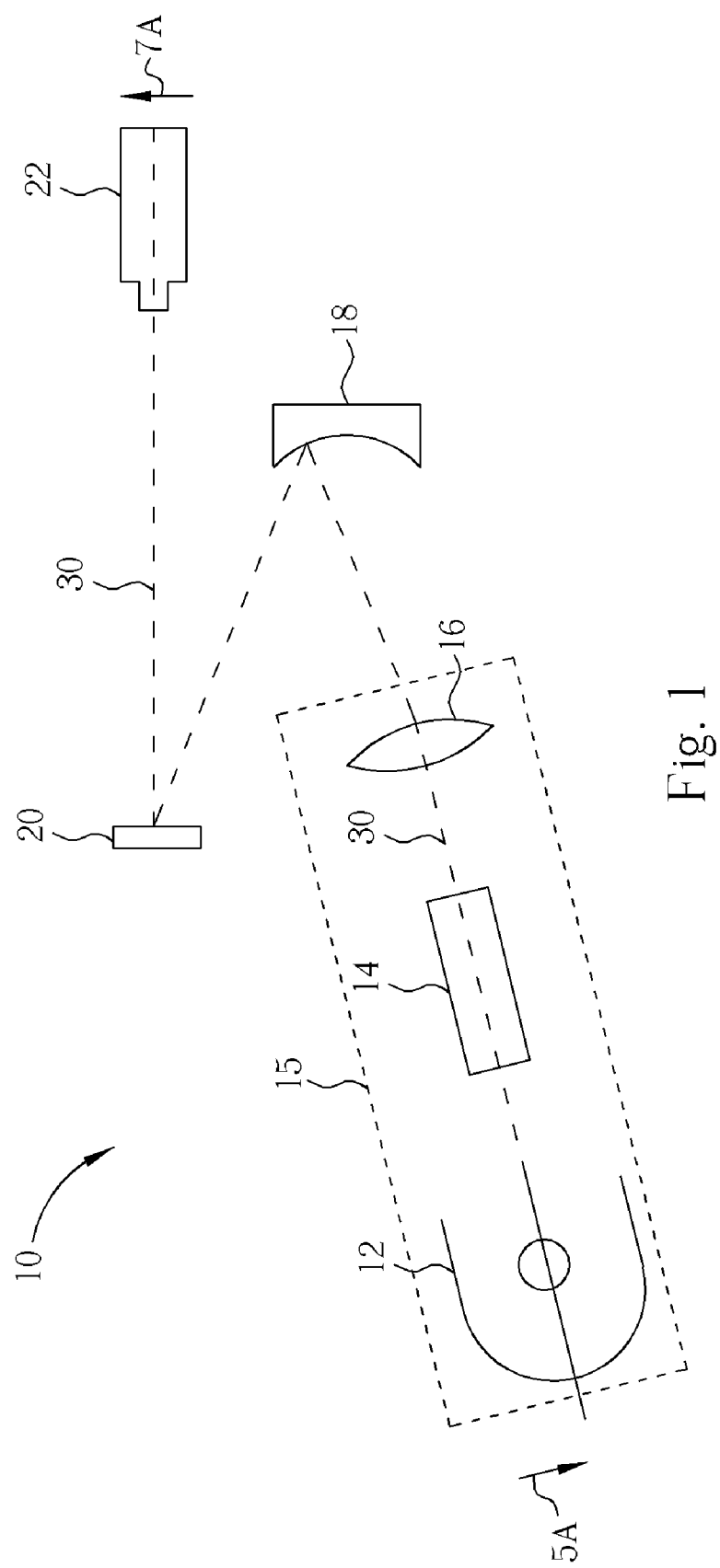
FIG. 1 is a diagram of a projector according to a first embodiment of the present invention.

Please refer to FIG. 1. FIG. 1 is a diagram of a projector 10 according to a first embodiment of the present invention. In the following disclosure, only components of the projector 10 that are relevant to the present invention are illustrated and described for clarity and simplicity. The projector 10 contains a lamp 12 for serving as a light source of the projector 10 and providing light beams 30. The light beams 30 emitted by the lamp 12 pass through a light pipe 14, which guides the light beams 30 to an aspherical lens 16. The lamp 12, the light pipe 14, and the aspherical lens 16 are collectively referred to as illumination optics 15. The illumination optics 15 can also optionally contain a concave mirror 18. The aspherical lens 16 focuses the light beams 30 onto the concave mirror 18. The concave mirror 18 reflects the light beams 30 to a digital mirror device (DMD) 20, which modulates the light beams 30 and reflects the light beams 30 to a projection lens 22. The projection lens 22 receives the light beams 30 from the DMD 20 and projects images from the projector 10 onto a viewing surface or a screen. The present invention projector 10 allows the position of two or more of the components of the projector 10 to be adjusted for changing an offset of the image projected by the projector 10. For example, the illumination optics 15 can be adjusted along arrow 5A while the projection lens 22 is adjusted along arrow 7A. Adjusting the position of the illumination optics 15 compensates for lower projected light intensity as a result of adjusting the position of the projection lens 22.

Figure 2:
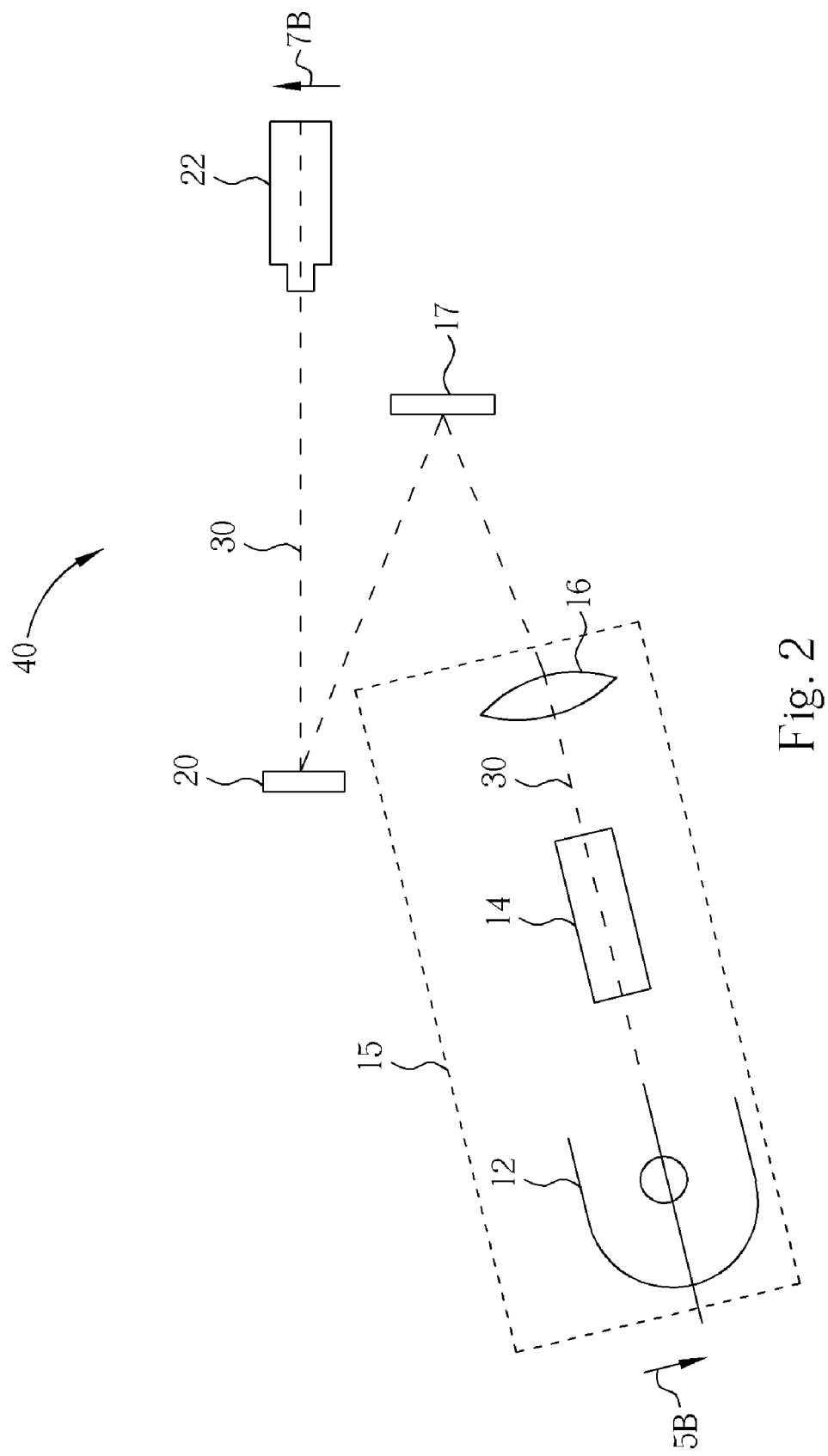
FIG. 2 is a diagram of a projector according to a second embodiment of the present invention.

Please refer to FIG. 2. FIG. 2 is a diagram of a projector 40 according to a second embodiment of the present invention. Differing from the projector 10 shown in FIG. 1, the projector 40 contains a mirror 17 instead of the concave mirror 18. The light beams 30 emitted by the lamp 12 pass through the light pipe 14, which guides the light beams 30 to the aspherical lens 16. The aspherical lens 16 focuses the light beams 30 onto the mirror 17. The mirror 17 reflects the light beams 30 to the DMD 20, which modulates the light beams 30 and reflects the light beams 30 to the projection lens 22. For adjusting the offset of the projected image, the illumination optics 15 can be adjusted along arrow 5B while the projection lens 22 is adjusted along arrow 7B.

Figure 3:
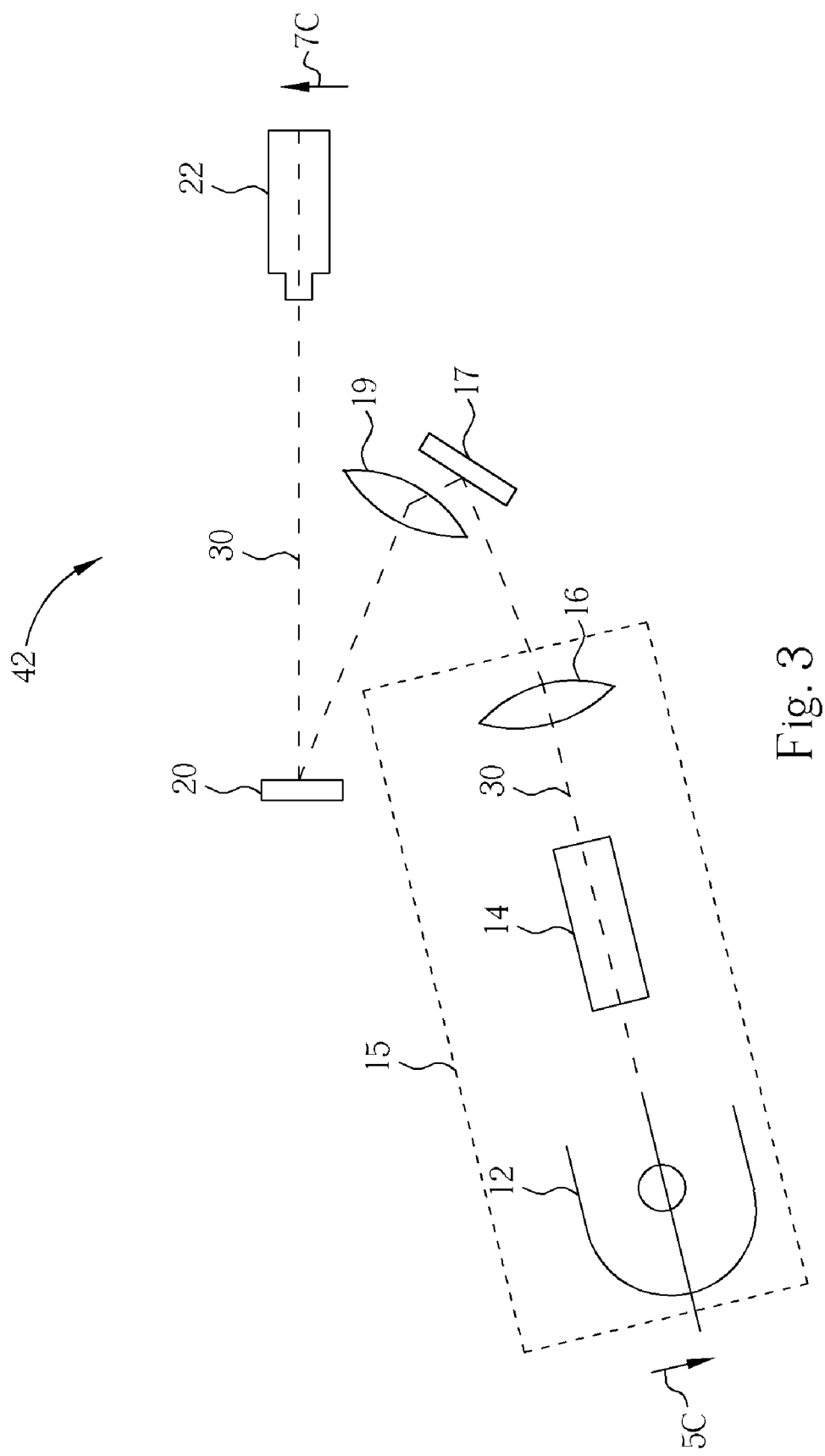
FIG. 3 is a diagram of a projector according to a third embodiment of the present invention.

Please refer to FIG. 3. FIG. 3 is a diagram of a projector 42 according to a third embodiment of the present invention. Differing from the projector 40 shown in FIG. 2, the projector 42 contains a lens 19 used in conjunction with the mirror 17 instead of only using the mirror 17. The light beams 30 emitted by the lamp 12 pass through the light pipe 14, which guides the light beams 30 to the aspherical lens 16. The aspherical lens 16 focuses the light beams 30 onto the mirror 17. The mirror 17 reflects the light beams 30 to the lens 19, which focuses the light onto the DMD 20. The DMD 20 modulates the light beams 30 and reflects the light beams 30 to the projection lens 22. For adjusting the offset of the projected image, the illumination optics 15 can be adjusted along arrow 5C while the projection lens 22 is adjusted along arrow 7C.

Figure 4:
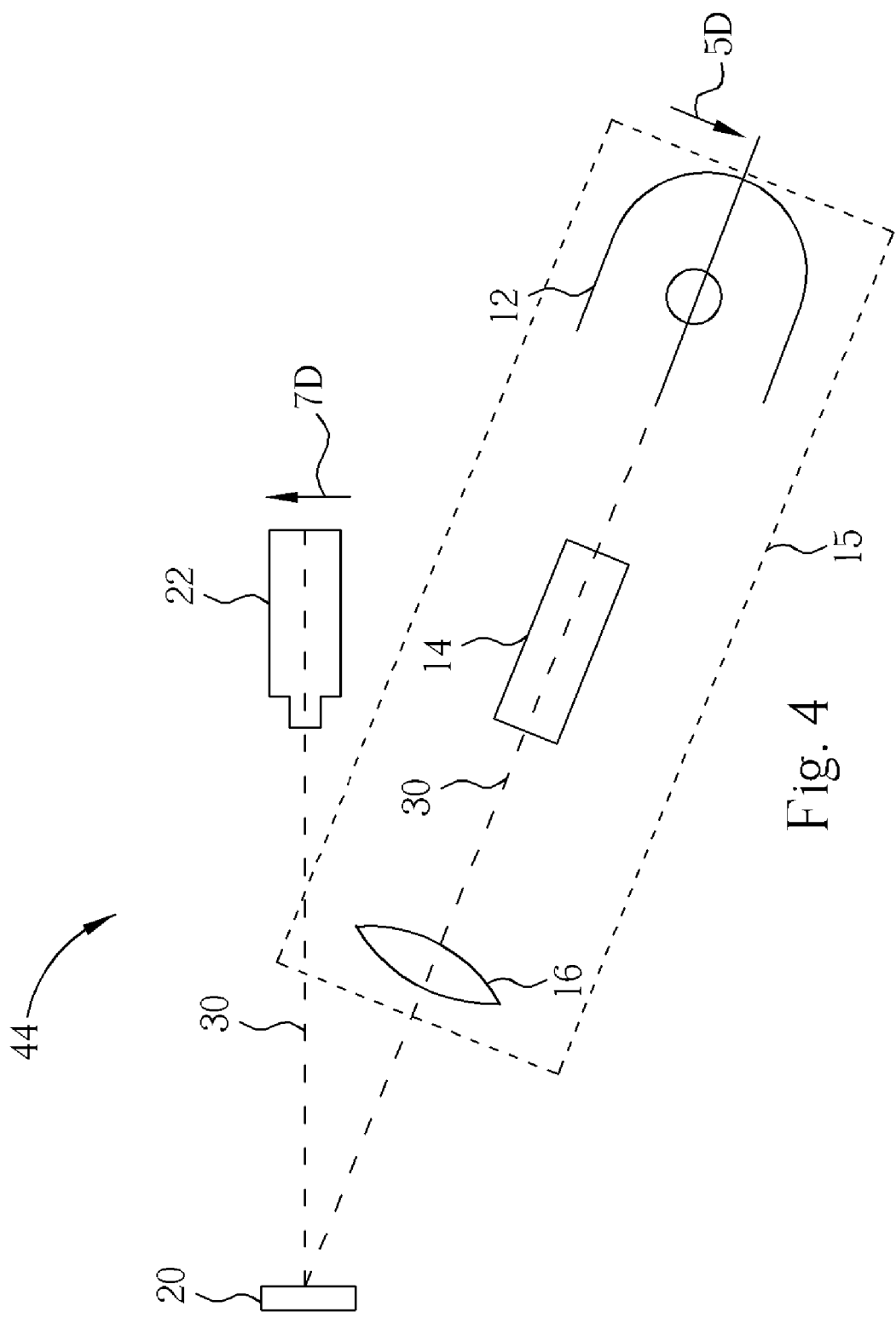
FIG. 4 is a diagram of a projector according to a fourth embodiment of the present invention.

Please refer to FIG. 4. FIG. 4 is a diagram of a projector 44 according to a fourth embodiment of the present invention. Differing from the projector 10 shown in FIG. 1, the projector 44 does not contain the concave mirror 18 or any other mirror. Instead, light travels from the aspherical lens 16 to the DMD 20 directly. That is, the light beams 30 emitted by the lamp 12 pass through the light pipe 14, which guides the light beams 30 to the aspherical lens 16. The aspherical lens 16 focuses the light beams 30 onto the DMD 20. The DMD 20 modulates the light beams 30 and reflects the light beams 30 to the projection lens 22. For adjusting the offset of the projected image, the illumination optics 15 can be adjusted along arrow 5D while the projection lens 22 is adjusted along arrow 7D.

Figure 5:
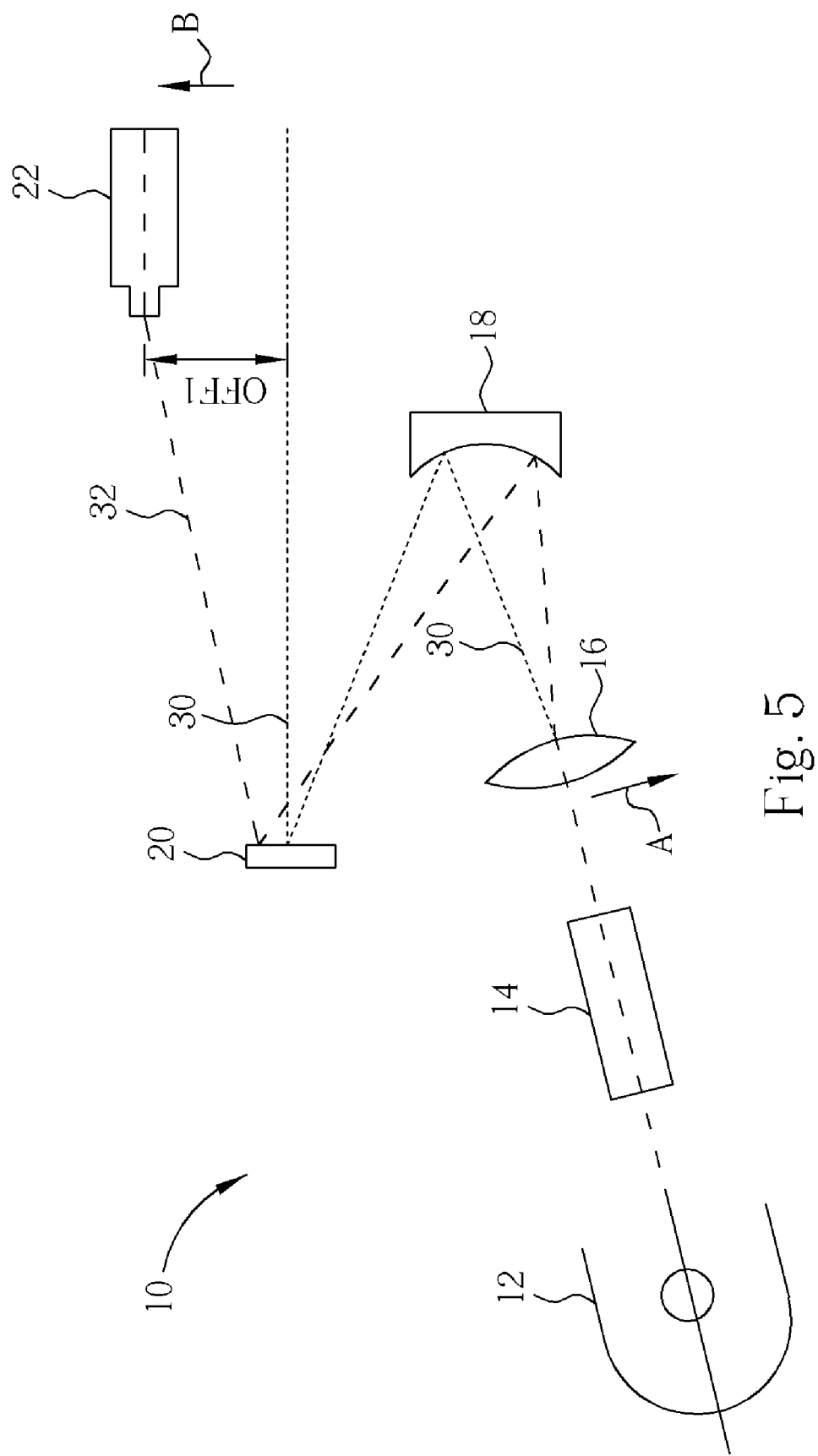
FIG. 5 is a diagram of the projector according to the first embodiment in which positions of the aspherical lens and the projection lens have been adjusted.

Please refer to FIG. 5. FIG. 5 is a diagram of the projector 10 according to the first embodiment in which positions of the aspherical lens 16 and the projection lens 22 have been adjusted. As compared to positions in FIG. 1, the position of the aspherical lens 16 has been moved downward along arrow A and the position of the projection lens 22 has been moved upward along arrow B. Due to these changes in position, projected light beams 32 are offset from the original position of the light beams 30. An offset OFF1 between the light beams 30 and the light beams 32 is illustrated in FIG. 5. By moving the position of the aspherical lens 16 downward along arrow A, the offset OFF1 between the light beams 30 and the light beams 32 is created. Therefore, the projection lens 22 is also moved upward along arrow B so that the light beams 32 pass through a pupil of the projection lens 22. Although the aspherical lens 16 and the projection lens 22 can be moved separately, they are preferably moved simultaneously by gears or other adjusting devices that can be operated manually or operated electronically by motors such as step motors or DC motors.

Figure 6:
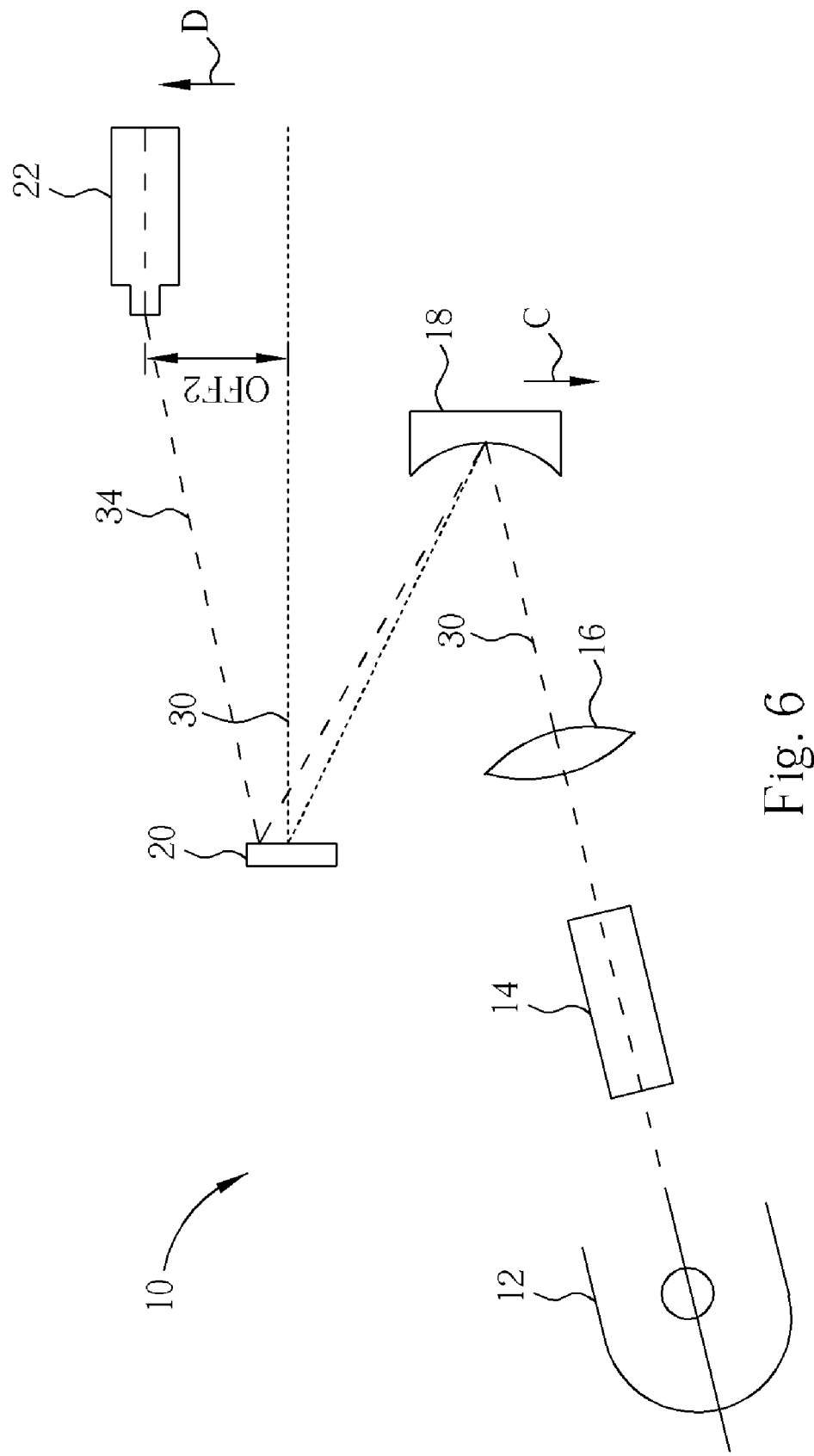
FIG. 6 is a diagram of the projector according to the first embodiment in which positions of the concave mirror and the projection lens have been adjusted.

Please refer to FIG. 6. FIG. 6 is a diagram of the projector 10 according to the first embodiment in which positions of the concave mirror 18 and the projection lens 22 have been adjusted. As compared to positions in FIG. 1, the position of the concave mirror 18 has been moved downward along arrow C and the position of the projection lens 22 has been moved upward along arrow D. Due to these changes in position, projected light beams 34 are offset from the original position of the light beams 30. An offset OFF2 between the light beams 30 and the light beams 34 is illustrated in FIG. 6. By moving the position of the concave mirror 18 downward along arrow C, the offset OFF2 between the light beams 30 and the light beams 34 is created. Therefore, the projection lens 22 is also moved upward along arrow D so that the light beams 34 pass through a pupil of the projection lens 22. Although the concave mirror 18 and the projection lens 22 can be moved separately, they are preferably moved simultaneously using movements in proper proportion with each other. While only two components of the projector 10 need to be moved in order to create an offset of the projected images, more components can also be moved. For instance, the aspherical lens 16, the concave mirror 18, and the projection lens 22 can all be moved at the same time for adjusting the offset of the projected images. If a greater number of components have adjusted positions, then the displacement required for adjusting the position of each component can be lowered.

The above has shown how components of the projector 10 of the first embodiment can be adjusted for creating an offset of the projected images. The projectors of the second, third, and fourth embodiments also have components that can be adjusted. For instance, the mirror 17 or the aspherical lens 16 of the projector 40 shown in FIG. 2 can be moved in conjunction with the projection lens 22 for creating an offset. Likewise, a combination of one or more of the mirror 17, the lens 19, or the aspherical lens 16 of the projector 42 shown in FIG. 3 can be moved in conjunction with the projection lens 22 for creating an offset. As for the projector 44 shown in FIG. 4, the aspherical lens 16 can be moved in conjunction with the projection lens 22 for creating an offset.

Figure 7:
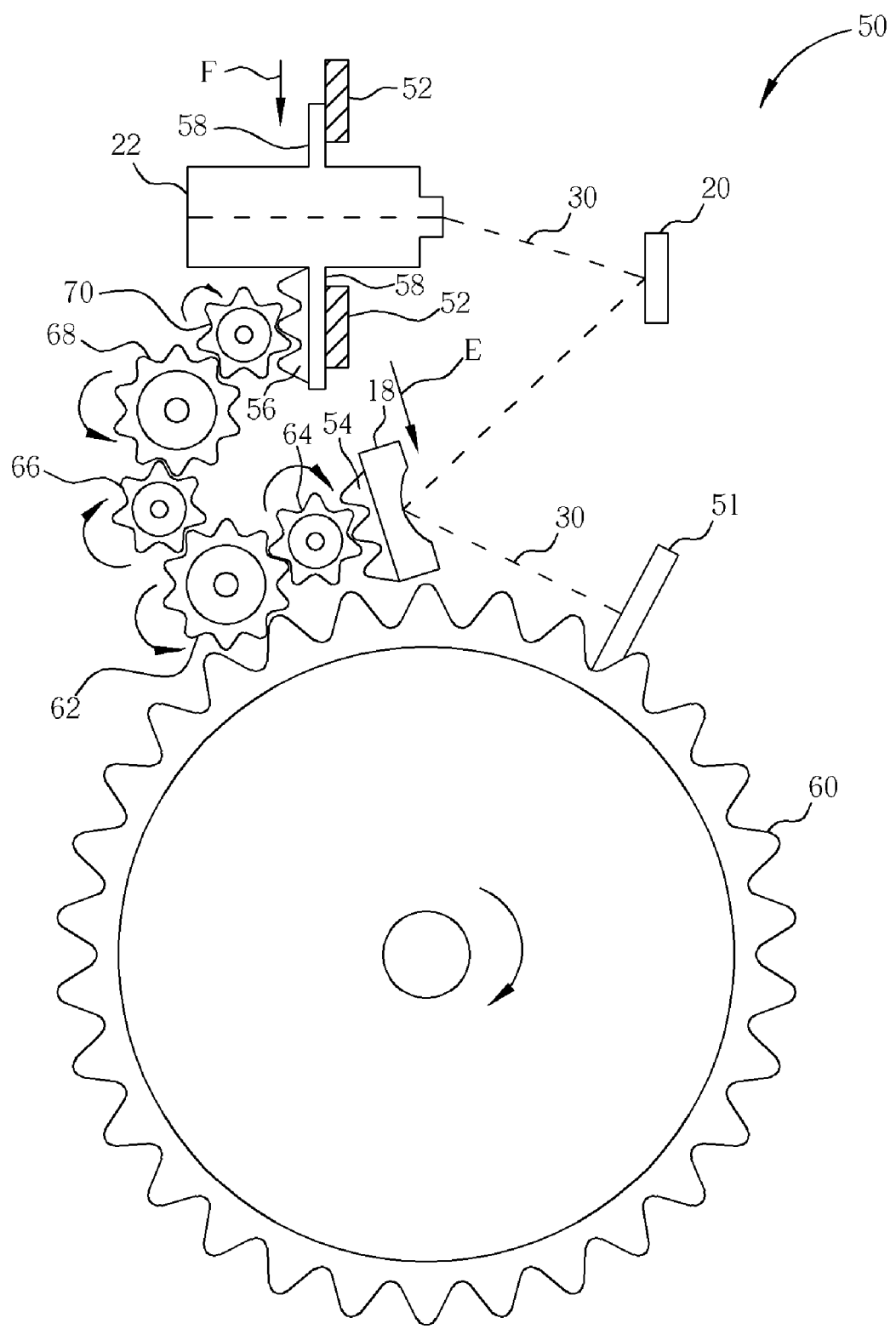
FIG. 7 is a diagram of a projector according to a fifth embodiment of the present invention.

Please refer to FIG. 7. FIG. 7 is a diagram of a projector 50 according to a fifth embodiment of the present invention. The projector 50 contains different components than the projector 10 and also contains a plurality of gears 60-70 for adjusting the positions of the concave mirror 18 and he projection lens 22. In FIG. 7, the projector 50 contains a folding mirror 51 for reflecting light beams 30 emitted by a lamp (not shown in FIG. 7) to a concave mirror 18. The use of the folding mirror 51 allows the projector 50 to be built with a compact shape for reducing the overall size of the projector 50. The light beams 30 are reflected from the concave mirror 18 to the DMD 20, and are then reflected to the pupil of the projection lens 22. The aspherical lens 16 is not shown in FIG. 7 for clarity, but may also be included in the projector 50.

The body of the projection lens 22 has adjusting legs 58 that rest against rigid members 52 of the housing of the projector 50. The rigid members 52 keep the projection lens 22 in place while allowing the adjusting legs 58 to move up and down against the rigid members 52. In this way, the projection lens 22 can move downward along arrow F or move up in the opposite direction. The downward and upward movement of the projection lens 22 is produced by the rotation of gear 70, which moves a straight gear rack 56 attached to one of the adjusting legs 58 up and down. A main gear 60 is used for rotating a series of smaller gears.

Although several gears are shown in FIG. 7, a smaller number or a larger number of gears may also be used with the present invention. In FIG. 7, the main gear 60 is shown as rotating clockwise. The main gear 60 rotates gear 62, which rotates counter-clockwise. Gear 62 causes gear 66 to rotate in a clockwise direction, and in turn causes gear 68 to rotate in a counter-clockwise direction. Finally, the rotation of gear 68 causes gear 70 to rotate in a clockwise direction, and thereby causes the straight gear rack 56 to move upwards. At the same time, the rotation of gear 62 causes gear 64 to rotate in a clockwise direction. The rotation of gear 64 causes straight gear rack 54, which is attached to the concave mirror 18, to move downward along arrow E. Therefore, turning the main gear 60 adjusts the position of both the projection lens 22 and the concave mirror 18. Additional gears may be used for adjusting the position of the folding mirror 51 as well.

In summary, adjusting positions of the optical components of the present invention projector allows an image projected by the projector to be offset. Instead of manually adjusting the height of one leg of the projector using an adjustable leg, the positions of the optical components can be adjusted instead. Those skilled in the art will appreciate that any kind of adjusting device can be used for adjusting the positions of the projection lens 22, the concave mirror 18, and the folding mirror 51. As was shown in FIG. 5, the position of the aspherical lens 16 can also be adjusted. A variety of adjustments to the optical components of the projector are possible so long as the light beams reach the pupil of the projection lens 22.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
   illumination optics comprising a lamp for providing light beams;
   a light modulating apparatus for receiving and modulating the light beams provided by the illumination optics;
   a projection lens for projecting an image of the light beams received from the light modulating apparatus;
   a first adjusting device for adjusting a position of the illumination optics, including adjusting a position of the lamp, and adjusting an angle of incidence of the light beams emitted onto the light modulating apparatus; and
   a second adjusting device for adjusting a position of the projection lens in response to the adjustment of the position of the illumination optics for creating an offset of a position of the image projected by the projection lens.

2. The projector of claim 1, wherein the first adjusting device adjusts the position of the illumination optics at the same time as the second adjusting device adjusts the position of the projection lens.

3. The projector of claim 1, wherein the illumination optics comprises a concave mirror.

4. The projector of claim 1, wherein the illumination optics comprises an aspherical lens and the first adjusting device adjusts the position of the aspherical lens.

5. The projector of claim 1, wherein the illumination optics comprises a concave mirror and an aspherical lens and the first adjusting device adjusts the position of both the concave mirror and the aspherical lens while the second adjusting device simultaneously moves adjusts the position of the projection lens.

6. The projector of claim 1, further comprising a folding mirror for reflecting light beams emitted by the illumination optics and a third adjusting device for adjusting a position of the folding mirror at the same time as the first and second adjusting devices adjust the positions of the illumination optics and the projection lens.

7. A method for adjusting an offset of an image projected by a projector,
   the projector comprising:
   illumination optics comprising a lamp for providing light beams;
   a light modulating apparatus for receiving and modulating the light beams provided by the illumination optics; and
   a projection lens for projecting an image of the light beams;
   the method comprising:
   adjusting a position of the illumination optics, including adjusting a position of the lamp, for adjusting an angle of incidence of the light beams emitted onto the light modulating apparatus, and adjusting a position of the projection lens for creating an offset of a position of the image projected by the projection lens.

8. The method of claim 7 wherein the positions of the projection lens and the illumination optics are adjusted simultaneously.

9. The method of claim 7 wherein the illumination optics comprises a concave mirror and an aspherical lens and the method comprises adjusting the positions of the projection lens and the aspherical lens for creating the offset of the position of the image projected by the projection lens.

10. The method of claim 9 wherein the positions of the projection lens, concave mirror, and aspherical lens are adjusted simultaneously.

* * * * *